United States Patent
Lee et al.

(10) Patent No.: US 11,714,593 B2
(45) Date of Patent: Aug. 1, 2023

(54) MODULAR DISPLAY APPARATUS AND METHOD FOR CONTROLLING THEREOF

(71) Applicant: SAMSUNG ELECTRONICS CO., LTD., Suwon-si (KR)

(72) Inventors: Joohyun Lee, Suwon-si (KR); Junhyung Shin, Suwon-si (KR); Jiyong Park, Suwon-si (KR); Seongkoo Cheong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 219 days.

(21) Appl. No.: 17/424,086

(22) PCT Filed: Jun. 4, 2021

(86) PCT No.: PCT/KR2021/006996
§ 371 (c)(1),
(2) Date: Jul. 19, 2021

(87) PCT Pub. No.: WO2022/039358
PCT Pub. Date: Feb. 24, 2022

(65) Prior Publication Data
US 2023/0161535 A1 May 25, 2023

(30) Foreign Application Priority Data
Aug. 19, 2020 (KR) .................. 10-2020-0104024

(51) Int. Cl.
*G06F 3/14* (2006.01)
*G09F 9/302* (2006.01)
*G09G 3/3225* (2016.01)

(52) U.S. Cl.
CPC .......... *G06F 3/1446* (2013.01); *G09F 9/3026* (2013.01); *G09G 3/3225* (2013.01);
(Continued)

(58) Field of Classification Search
CPC .............................................. G09G 2300/026
See application file for complete search history.

(56) References Cited

U.S. PATENT DOCUMENTS 8,237,867 B2  8/2012  Cha
8,988,451 B2  3/2015  Han et al.
(Continued)

FOREIGN PATENT DOCUMENTS

JP     2013190566 A    9/2013
JP       5946281 B2    7/2016
(Continued)

OTHER PUBLICATIONS

International Search Report (PCT/ISA/210) issued by the International Searching Authority in International Application No. PCT/KR2021/006996, dated Sep. 17, 2021.
(Continued)

*Primary Examiner* — Sepehr Azari
(74) *Attorney, Agent, or Firm* — Sughrue Mion, PLLC

(57) ABSTRACT

A modular display apparatus is provided. The modular display apparatus includes a plurality of display apparatuses, each of which includes a plurality of pixels; a storage configured to store a plurality of gain sets, each of which includes gain values respectively corresponding to a plurality of power loads; and a processor configured to: identify a gain set from among the plurality of gain sets based on a resolution of the modular display apparatus; transmit the gain set to the plurality of display apparatuses; receive a plurality of gain values which respectively correspond to power loads for the plurality of display apparatuses to display an image from the plurality of display apparatuses; and transmit a gain value from among the plurality of gain values to the plurality of display apparatuses. Each of the plurality of display apparatuses is configured to display the image by driving a plurality of light-emitting devices of the
(Continued)

plurality of pixels based on the gain value received from the processor.

15 Claims, 13 Drawing Sheets

(52) U.S. Cl.
CPC ............... *G09G 2300/026* (2013.01); *G09G 2320/0233* (2013.01); *G09G 2330/021* (2013.01); *G09G 2340/0407* (2013.01); *G09G 2360/16* (2013.01)

(56) References Cited

U.S. PATENT DOCUMENTS

| | | | |
|---|---|---|---|
| 9,626,145 B1* | 4/2017 | Fu | ............................ G09G 3/20 |
| 10,510,320 B2 | 12/2019 | Kang et al. | |
| 10,825,378 B2 | 11/2020 | Kim et al. | |
| 2014/0240201 A1 | 8/2014 | Takahashi et al. | |
| 2018/0061298 A1* | 3/2018 | Cho | ..................... G09G 3/3666 |
| 2019/0122601 A1 | 4/2019 | Li et al. | |
| 2020/0126476 A1* | 4/2020 | Joo | ........................ G06F 3/1446 |
| 2020/0234628 A1 | 7/2020 | Kim et al. | |
| 2021/0065625 A1* | 3/2021 | Wang | ................... G09G 3/3233 |
| 2021/0295760 A1* | 9/2021 | Lee | ........................ G06F 3/1446 |
| 2021/0358426 A1* | 11/2021 | Lee | ....................... G09G 3/3648 |
| 2022/0157236 A1* | 5/2022 | Feng | .................... G09G 3/3233 |

FOREIGN PATENT DOCUMENTS

| | | | |
|---|---|---|---|
| KR | 101244679 B1 | 3/2013 | |
| KR | 10-2013-0099505 A | 9/2013 | |
| KR | 10-2018-0023705 A | 3/2018 | |
| KR | 1020190000649 A | 1/2019 | |
| KR | 102020283 B1 | 9/2019 | |
| KR | 10-2030438 B1 | 11/2019 | |
| KR | 10-2020-0089951 A | 7/2020 | |
| KR | 10-2021-0047625 A | 4/2021 | |

OTHER PUBLICATIONS

Written Opinion (PCT/ISA/237) issued by the International Searching Authority in International Application No. PCT/KR2021/006996, dated Sep. 17, 2021.

* cited by examiner 110-1

| Power load | gain |
|---|---|
| 0 | 2040 |
| 1 | 2040 |
| 2 | 2040 |
| 3 | 2040 |
| ... | ... |
| 10 | 2040 |
| 11 | 2038 |
| 12 | 2034 |
| 13 | 2022 |
| 14 | 2012 |
| ... | ... |
| 98 | 0.5 |
| 99 | 0.2 |
| 100 | 0.1 |

| Power load | gain |
|---|---|
| 0 | 2040 |
| 1 | 2040 |
| 2 | 2040 |
| 3 | 2040 |
| ... | ... |
| 40 | 2040 |
| 41 | 2036 |
| 42 | 2030 |
| 43 | 2022 |
| 44 | 2012 |
| ... | ... |
| 98 | 0.5 |
| 99 | 0.2 |
| 100 | 0.1 |

MODULAR DISPLAY APPARATUS AND METHOD FOR CONTROLLING THEREOF

This is a National Stage of International Application No. PCT/KR2021/006996, filed on Jun. 4, 2021, which claims priority to Korean Patent Application No. 10-2020-0104024, filed on Aug. 19, 2020, in the Korean Intellectual Property Office, the disclosures of which are incorporated by reference herein in their entireties.

TECHNICAL FIELD

The disclosure relates to a modular display apparatus and a method for controlling thereof. More particularly, the disclosure relates to a modular display apparatus capable of displaying an image through a plurality of display apparatuses and a method for controlling thereof.

BACKGROUND ART

A display apparatus capable of controlling brightness of an image is being developed. The display apparatus as described above may be configured to control a peak luminance of a displayed image based on the peak luminance control data.

A modular display apparatus which combines a plurality of display apparatuses is under development. As described above, the modular display apparatus may include a plurality of display apparatuses, and respective display apparatuses may display a portion of a divided image. Accordingly, the modular display apparatus may display an image through a large-scale screen formed by the plurality of display apparatuses.

The modular display apparatus may be implemented in various resolutions according to the number of the plurality of display apparatuses. Accordingly, based on respective display apparatuses of the modular display apparatus that are controlling the luminance of the image according to one peak luminance control data, the luminance of the image displayed in the modular display apparatus, which is combined to have a first resolution despite being the same image data, may have a luminance that is different from the luminance of the image displayed in the modular display apparatus which is combined to have a second resolution.

DISCLOSURE

Technical Problem

One or more embodiments address at least the above-mentioned problems and/or disadvantages and to provide at least the advantages described below. Accordingly, one or more embodiments provide a modular display apparatus which displays a corrected image according to peak luminance control data corresponding to a resolution of the modular display apparatus and a method for controlling thereof.

Technical Solution

According to embodiments of the disclosure, a modular display apparatus includes: a plurality of display apparatuses, each of which comprises a plurality of pixels; a storage configured to store a plurality of gain sets, each of which comprises gain values respectively corresponding to a plurality of power loads; and a processor configured to: identify a gain set from among the plurality of gain sets based on a resolution of the modular display apparatus; transmit the gain set to the plurality of display apparatuses; receive a plurality of gain values which respectively correspond to power loads for the plurality of display apparatuses to display an image from the plurality of display apparatuses; and transmit a gain value from among the plurality of gain values to the plurality of display apparatuses. Each of the plurality of display apparatuses is configured to display the image by driving a plurality of light-emitting devices of the plurality of pixels based on the gain value received from the processor.

The processor may be further configured to identify a minimum gain value from among the plurality of gain values received from the plurality of display apparatuses, and identify the minimum gain value as the gain value to be transmitted to the plurality of display apparatuses.

Each of the plurality of display apparatuses may be further configured to: receive image data from the processor; identify corresponding image data which from among the image data based on identification information of the plurality of display apparatuses; identify a corresponding gain value which corresponds to a power load for displaying the corresponding image data from among the plurality of gain values; and transmit the corresponding gain value to the processor.

Each of the plurality of display apparatuses may be further configured to: identify the power load for displaying the image based on the image data; and identify the gain value based on the power load.

Each of the plurality of display apparatuses may be further configured to: receive image data from the processor; identify corresponding image data from among the image data; apply the gain value received from the processor to an electrical signal corresponding to the corresponding image data; and drive the plurality of light-emitting devices based on the electrical signal to which the gain value is applied.

The processor may be further configured to identify the resolution of the modular display apparatus based on a number of the plurality of display apparatuses.

The processor may be further configured to receive image data from an external apparatus, and identify the resolution of the plurality of display apparatuses based on resolution information of the image data.

A first luminance of the image which is displayed by the plurality of display apparatuses based on the resolution being a first resolution may be within a threshold value of a second luminance of the image which is displayed by the plurality of display apparatuses based on the resolution being a second resolution which is different from the first resolution.

According to embodiments of the disclosure, a method of controlling a modular display apparatus which includes a plurality of display apparatuses, includes: identifying a gain set from among a plurality of gain sets based on a resolution of the modular display apparatus; transmitting the gain set and image data to the plurality of display apparatuses; receiving a plurality of gain values which respectively correspond to power loads for the plurality of display apparatuses to display an image from the plurality of display apparatuses; transmitting a gain value from among the plurality of gain values to the plurality of display apparatuses; and controlling each of the plurality of display apparatuses to drive a plurality of light-emitting devices based on the gain value and the image data.

The method may further include: identifying a minimum gain value from among the plurality of gain values received from the plurality of display apparatuses; and identifying the minimum gain value as the gain value to be transmitted to the plurality of display apparatuses.

The method may further include: identifying, for each of the plurality of display apparatuses, corresponding image data from among the image data; and identifying, for each of the plurality of display apparatuses, a corresponding gain value which corresponds to a power load for displaying the corresponding image data from among the plurality of gain values.

The method may further include identifying a plurality of power loads respectively corresponding to the plurality of display apparatuses for displaying the image based on the corresponding image data.

The method may further include: identifying corresponding image data for each of the plurality of display apparatuses from among the image data; applying the gain value to an electrical signal corresponding to the corresponding image data; and driving the plurality of light-emitting devices based on the electrical signal to which the gain value is applied.

The method may further include identifying the resolution of the modular display apparatus based on a number of the plurality of display apparatuses.

The method may further include: receiving image data from an external device; and identifying the resolution of the plurality of display apparatuses based on resolution information of the image data.

Effect of Invention

According to one or more embodiments of the disclosure as described above, an image corrected according to peak luminance control data corresponding to a resolution of a modular display apparatus may be provided.

DESCRIPTION OF DRAWINGS

The above and other aspects, features, and advantages of certain embodiments of the present disclosure will be more apparent from the following description taken in conjunction with the accompanying drawings, in which:

FIG. 3 is a diagram illustrating a first gain set corresponding to a first resolution according to an embodiment;

FIG. 5 is a diagram illustrating a second gain set corresponding to a second resolution according to an embodiment;

MODE FOR INVENTION

The terms used in describing one or more embodiments are general terms that have been selected considering their function herein. However, the terms may change depending on intention, legal or technical interpretation, emergence of new technologies, and the like of those skilled in the related art. Further, in certain cases, there may be terms arbitrarily selected. In this case, the meaning of the term may be interpreted as defined in the description, or may be interpreted based on the overall context of the disclosure and the technical common sense according to the related art.

As used herein, the terms "1st" or "first" and "2nd" or "second" may use corresponding component regardless of importance or order and are used to distinguish a component from another without limiting the components. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Embodiments will be described in detail below with reference to the accompanied drawings.

Figure 1A:
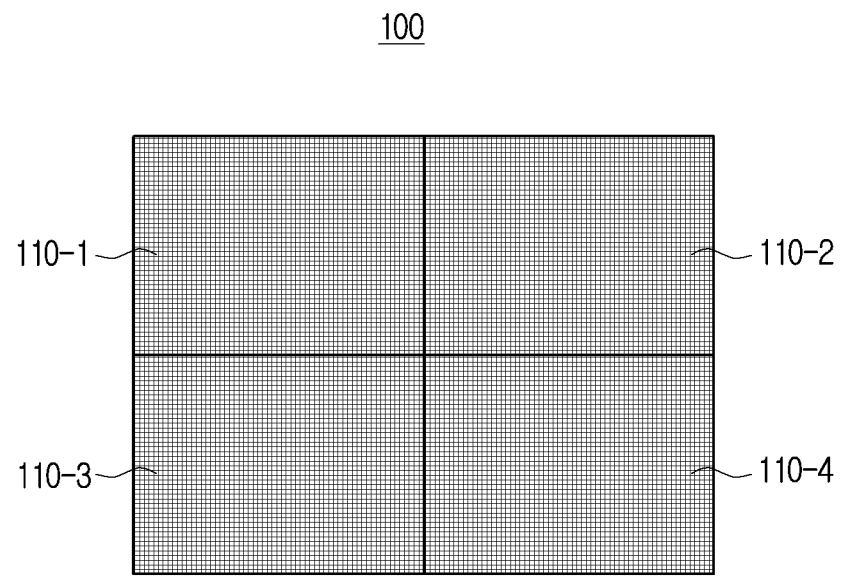
FIG. 1A is a diagram illustrating a modular display apparatus according to an embodiment.
Figure 1B:
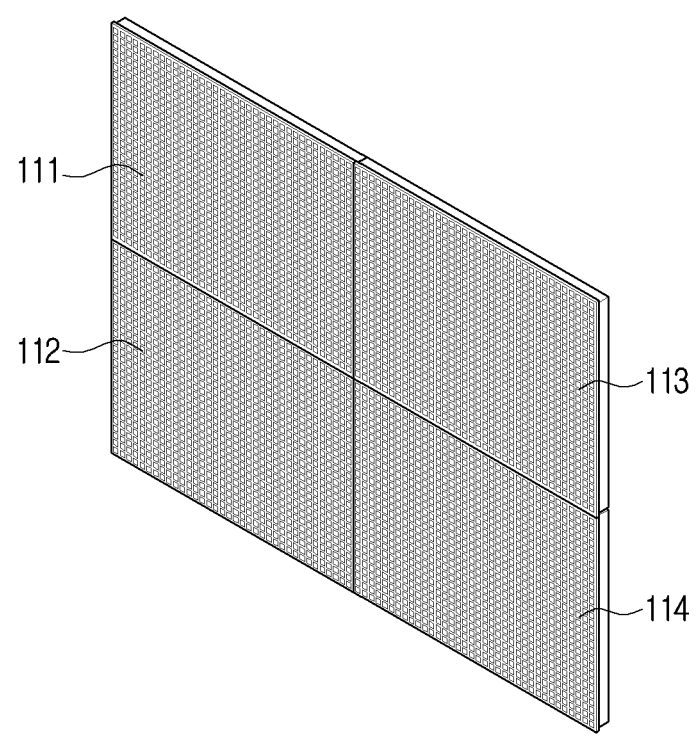
FIG. 1B is a diagram illustrating one from among a plurality of display apparatuses included in a modular display apparatus according to an embodiment.

FIG. 1A is a diagram illustrating a modular display apparatus according to an embodiment, and FIG. 1B is a diagram illustrating one from among a plurality of display apparatuses included in a modular display apparatus according to an embodiment.

Referring to FIG. 1A, the modular display apparatus 100 according to an embodiment may include a plurality of display apparatuses 110-1, 110-2, 110-3 and 110-4. Here, the respective display apparatuses 110-1, 110-2, 110-3 and 110-4 may be designated as a sub screen or a cabinet.

Referring to FIG. 1B, the display apparatus 110-1 according to an embodiment may include one or a plurality of display modules.

For example, as illustrated in FIG. 1B, the display apparatus 110-1 according to an embodiment may include four display modules 111, 112, 113 and 114. Here, the respective display modules 111, 112, 113 and 114 may be physically connected and form one display.

The respective display modules 111, 112, 113 and 114 may be implemented as a light-emitting diode (LED) display module including inorganic light-emitting diode (inorganic LED) devices.

Specifically, the respective display modules 111, 112, 113 and 114 may be implemented as an LED display module which includes a plurality of pixels. Each of the plurality of pixels may include a red LED, a green LED, and a blue LED, which are sub pixels provided on one chip.

According to an embodiment, the above-described LED may be a micro LED. Here, the micro LED may be an LED of about 5 to 100 micrometer size, and may be an ultra-small light-emitting device that emits light on its own without a color filter.

The plurality of pixels may be electrically connected with a driver integrated circuit (IC). The driver IC may be electrically connected with a timing controller, and may be configured to control the plurality of pixels to emit light according to the control of the timing controller. Specifically, the timing controller may be configured to transmit image data for the control of the plurality of pixels to the driver IC, and the driver IC may be configured to convert the image data to analog data for the control of the plurality of pixels, and output current or apply current to the plurality of pixels according to the analog data. The respective pixels may emit light based on the current which is output by the driver IC or the voltage which is applied by the driver IC.

The display apparatus 110-1 may include a power supply (e.g., Switched-Mode Power Supply (SMPS)) which supplies power to a plurality of components included in the display apparatus 110-1.

According to an embodiment, the plurality of pixels may be arranged in a matrix form (e.g., M*N, here M and N are natural numbers). Specifically, the matrix may not only be in a square arrangement (e.g., M=N, here M and N are natural numbers, 16*16 arrangement, 24*24 arrangement, etc.) form, but also an arrangement (e.g., M≠N, here M and N are natural numbers) form different therefrom.

The above-described LED display module is one embodiment, and the display module may be implemented to various display modules such as, for example, and without limitation, and organic LED (OLED), an active-matrix OLED (AMOLED), or the like. The display module according to an embodiment will be described below as an LED display module for convenience of description.

As illustrated in FIG. 1B, the display apparatus 110-1 according to an embodiment may the display modules 111, 112, 113 and 114 which are provided in a 2*2 arrangement.

However, the LED display module of the 2*2 arrangement is one embodiment, and the arrangement form and number of the LED display modules may vary.

The display apparatus 110-1 may be connected with an adjacent display apparatus to implement the modular display apparatus 100. In an example, the respective display apparatuses 110-1, 110-2, 110-3 and 110-4 may be connected through a daisy chain method between one another, but embodiments are not limited thereto.

The modular display apparatus 100 which includes the plurality of display apparatuses may be referred to, for example, as a wall display or a video wall, or the like.

For example, as illustrated in FIG. 1A, the plurality of display apparatuses 110-1, 110-2, 110-3 and 110-4 may be connected in a 2*2 form. However, embodiments are not limited to the 2*2 form, and the arrangement and number of the plurality of display apparatuses included in the modular display apparatus 100 may vary.

The modular display apparatus 100 may be configured to display an image through the plurality of display apparatuses. Here, the image may be an image received from an external apparatus (e.g., a set top box, a computer, a server, etc.), or an image pre-stored in the modular display apparatus 100. Specifically, one image may be divided into a plurality of divided images, and the plurality of display apparatuses may respectively display the plurality of divided images to cooperatively display the one image. The plurality of display apparatuses may be configured to identify, based on identification information set in the respective display apparatuses, image data corresponding to the identification information of the respective display apparatuses from the input image data. Specifically, the respective display apparatuses may be configured to identify image data for displaying the image of a specific area from among the images corresponding to the input image data from the input image data based on the identification information of the respective display apparatuses, and respectively display the divided image based on the identified image data.

Here, the identification information of the respective display apparatuses may be pre-set per the respective display apparatuses according to the arrangement form of the plurality of display apparatuses. In an example, as illustrated in FIG. 1A, based on the plurality of display apparatuses 110-1, 110-2, 110-3 and 110-4 being arranged in a 2*2 form, the first display apparatus 110-1 may be set with identification information corresponding to an image of a first area (e.g., left upper end area) from among the images corresponding to the input image data, the second display apparatus 110-2 may be set with identification information corresponding to an image of a second area (e.g., right upper end area) from among the images corresponding to the input image data, the third display apparatus 110-3 may be set with identification information corresponding to an image of a third area (e.g., left lower end area) from among the images corresponding to the input image data, and the fourth display apparatus 110-4 may be set with identification information corresponding to an image of a fourth area (e.g., right lower end area) from among the images corresponding to the input image data.

The plurality of display apparatuses may be configured to display the image by controlling the light emission of the plurality of pixels based on the identified image data. Accordingly, the modular display apparatus 100 may be configured to display one whole image which is a combination of the divided images that is displayed by the plurality of display apparatuses.

As discussed above, the plurality of display apparatuses may receive image data, and identify image data corresponding to the identification information from the image data. However, embodiments are not limited thereto and according to an embodiment, the image data which corresponds to the respective display apparatuses may also be identified by a processor 130 which will be described below. Specifically, the processor 130 may be configured to identify, based on identification information set in the respective display apparatuses, image data (i.e., data for displaying the divided images) corresponding to the respective display apparatuses from the input image data, and transmit the respective identified image data to the plurality of display apparatuses. In an example, the processor 130 may be configured to identify a first to fourth image data for displaying in the first to fourth areas described above based on the identification information set (i.e., stored) in the respective display apparatuses, transmit the first image data to the first display apparatus 110-1, transmit the second image data to the second display apparatus 110-2, transmit the third image data to the third display apparatus 110-3, and transmit the fourth image data to the fourth display apparatus 110-4. In this case, the respective display apparatuses may be configured to display the divided images based on the image data received from the processor 130, and the modular display apparatus 100 may be configured to display one whole image which is a combination of the divided images.

Figure 2:
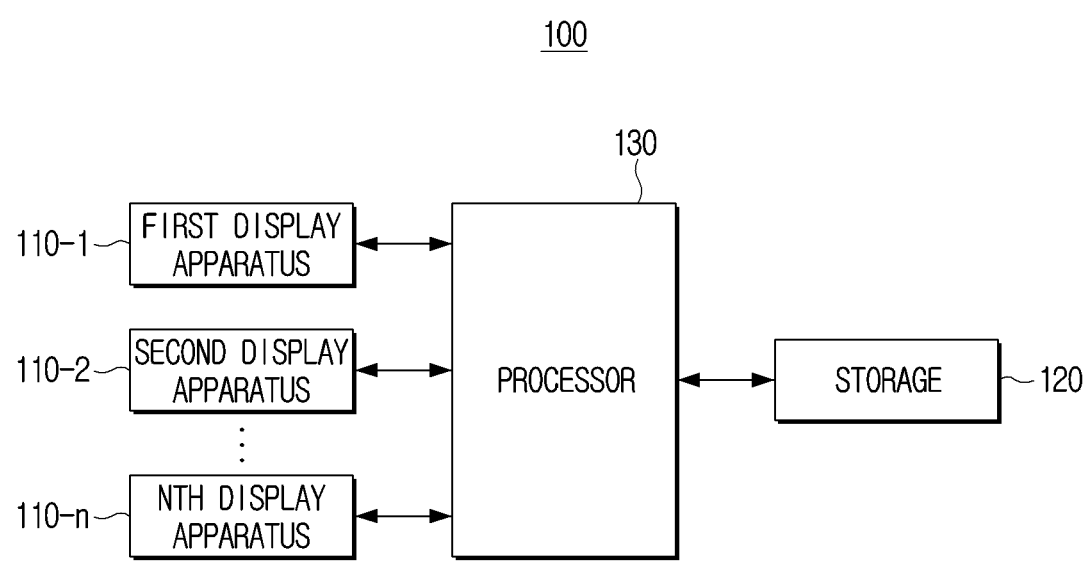
FIG. 2 is a block diagram illustrating a modular display apparatus according to an embodiment.

FIG. 2 is a block diagram illustrating the modular display apparatus according to an embodiment.

Referring to FIG. 2, the modular display apparatus 100 according to an embodiment may include a plurality of display apparatuses 110-1, 110-2, . . . , 110-*n*, a storage 120, and a processor 130.

According to an embodiment, the respective display apparatuses 110-1, 110-2, . . . , 110-*n* may include a sub processor, a driver IC, a plurality of pixels comprised of a plurality of light emitting devices of different colors from one another, and a power supply.

The respective display apparatuses 110-1, 110-2, . . . , 110-*n* may display an image. The sub processors included in the plurality of display apparatuses 110-1, 110-2, . . . , 110-*n* may be configured to receive image data from the processor 130. When the sub processors receive the image data, image data corresponding to the display apparatuses 110-1, 110-2, . . . , 110-*n* may be identified based on the identification information set in the display apparatuses 110-1, 110-2, . . . , 110-*n*. In an example, as illustrated in FIG. 1A, when the plurality of display apparatuses 110-1, 110-2, . . . , 110-*n* is arranged in a 2*2 form, the first display apparatus 110-1 may be set with ID 1, the second display apparatus 110-2 may be set with ID 2, the third display apparatus 110-3 may be set with ID 3, and the fourth display apparatus 110-4 may be set with ID 4. In this case, the sub processor included in the first display apparatus 110-1 may be configured to identify the first image data corresponding to ID 1 from among the image data, and transmit the first image data to the driver IC. In this case, the driver IC of the first display apparatus 110-1 may be configured to convert the first image data to a first data current (or, voltage) which is analog data, provide the first data current (or, voltage) to the plurality of pixels, and display a first image corresponding to the first image data. Likewise, the second to fourth display apparatuses 110-2, 110-3 and 110-4 may also display second to fourth images corresponding to the second to fourth image data based on identification information of the display apparatuses 110-2, 110-3 and 110-4.

The storage 120 may be configured to store an operating system (OS) for controlling the overall operation of the elements of the modular display apparatus 100, and instructions or data related to the elements of the modular display apparatus 100.

Accordingly, the processor 130 may be configured to use the various instructions or data stored in the storage 120 to control multiple hardware or software elements of the modular display apparatus 100, process instructions or data received from at least one from among the different elements by loading in a volatile memory, and store various data in a non-volatile memory.

The storage 120 may be configured to store a gain set which includes a plurality of gain values that corresponds to a plurality of power loads. Here, the gain set may be used for correcting the luminance of the image. According to an embodiment, the gain set may also be referred to as control data of peak luminance.

In particular, the storage 120 may be configured to store a plurality of gain sets, each of which includes the plurality of gain values that corresponds to the plurality of power loads per resolution. In an example, the storage 120 may be configured to store a first gain set for correcting the luminance of the image which is displayed in the display of a first resolution and a second gain set for correcting the luminance of the image which is displayed in the display of a second resolution. Here, the first resolution may be a resolution of 4 k (e.g., 3840*2160), and the second resolution may be a resolution of 8 k (e.g., 7680*4320). However, embodiments are not necessarily limited thereto. A specific example related to the gain set will be described below with reference to FIG. 3.

The storage 120 may be implemented as storage medium of various types. For example, the storage 120 may be a non-transitory storage, and may be implemented as a storage device such as, for example, and without limitation, a non-volatile memory device such as a read only memory (ROM), a programmable read only memory (PROM), a erasable programmable read only memory (EPROM), and a flash memory, a volatile memory device such as a random access memory (RAM), a hard disk, an optical disk, or the like.

The processor 130 may be configured to control the overall operation of the modular display apparatus 100. Specifically, the processor 130 may be configured to operate the operating system or an application program to control the hardware or software elements connected to the processor 130, and perform processing and calculation of various data. In addition, the processor 130 may be configured to process instructions or data received from at least one from among the different elements by loading to the volatile memory, and store various data in the non-volatile memory.

The processor 130 may include a central processing unit (CPU) or an application processor (AP). The processor 130 may be electrically connected with a plurality of sub processors of the plurality of display apparatuses 110-1, 110-2, . . . , 110-*n* and transmit and receive various data such as image data, control data, and the like.

The processor 130 may be configured to identify the resolution of the modular display apparatus 100 (or, resolution of the combined plurality of display apparatuses). Here, the resolution of the plurality of display apparatuses may be the resolution of the display which is formed by the plurality of display apparatuses.

The resolution of the modular display apparatus 100 may vary according to the number of the plurality of display apparatuses. In an example, based on a plurality of display apparatuses that each have a resolution of 960*540 being combined in a 4*4 arrangement, the modular display apparatus 100 may be a resolution of 4 k (e.g., 3840*2160), or based on the plurality of display apparatuses that each have a resolution of 960*540 being combined in an 8*8 arrangement, the resolution of the modular display apparatus 100 may be a resolution of 8 k (e.g., 7680*4320).

The processor 130 may also be configured to identify the resolution of the modular display apparatus 100 based on the resolution of the image data received externally. The processor 130 may be configured to analyze metadata which includes resolution information of the image data, and identify the resolution of the image data therefrom. In an example, the processor 130 may be configured to identify, based on the resolution of the image data being a resolution of 4 k, the resolution of the modular display apparatus 100 as a resolution of 4 k, and based on the resolution of the image data being a resolution of 8 k, identify the resolution of the modular display apparatus 100 as a resolution of 8 k.

Embodiments are not limited thereto, and the resolution of the modular display apparatus 100 may be pre-set according to user input. In this case, the processor 130 may be configured to identify the pre-set resolution as the resolution of the modular display apparatus 100 .

Alternatively, the processor 130 may be configured to identify the resolution of the modular display apparatus 100 based on the number of the plurality of display apparatuses which are electrically connected. Specifically, the processor 130 may be electrically connected with the plurality of display apparatuses through a plurality of interfaces. The processor 130 may be configured to identify the resolution of the modular display apparatus 100 based on the number of the plurality of display apparatuses connected through the plurality of interfaces and the resolution of the respective display apparatuses. In an example, based on four display apparatuses that each have a resolution of 960*540 being connected to the processor 130, the processor 130 may be configured to identify the resolution of the modular display apparatus 100 as a resolution of 4 k.

The processor 130 may be configured to identify the gain set corresponding to the resolution of the modular display apparatus 100 from among the plurality of gain sets stored in the storage 120. The storage 120 may be configured to store the plurality of gain sets corresponding to the plurality of resolutions.

First, the gain set according to an embodiment will be described with reference to FIG. 3.

FIG. 3 is a diagram illustrating a first gain set corresponding to a first resolution (e.g., 4 k resolution) according to an embodiment.

The gain set according to an embodiment may include the plurality of gain values which corresponds to the plurality of power loads. In an example, the power load included in the gain set may have a normalized value in a range of between 0% and 100%, and the gain value may have a value in the range of between 0 and 2040. The plurality of gain values may be matched to the plurality of power loads. The range of the gain value described above is not limited thereto, and the range of the gain value may vary.

Referring to FIG. 3, the plurality of gain values may be matched to the plurality of power loads included in the first gain set 10. In an example, a gain value of 2040 may be matched to a power load of between 0% and 10%, and gain values smaller than 2040 may be matched to a power load of between 11% and 100%.

The power load may be a power load for displaying an image which corresponds to the image data. The respective display apparatuses may be configured to identify, based on identification information and image data being received from the processor 130, image data which corresponds to the identification information of respective display apparatuses from among the image data, and identify the power load for displaying an image which corresponds to the identified image data. Specifically, the sub processor of the respective display apparatuses may be configured to identify the power consumed by the power supply for emitting the plurality of light-emitting devices according to the identified image data as the power load described above.

The plurality of gain values may be identified based on a rated capacity of the power supply and the power load of the power supply for displaying an image.

Specifically, the power supply included in the display apparatus may be configured to supply power to the components (e.g., driver IC, plurality of pixels, etc.) included in the display apparatus for displaying the image. Here, the power which is supplied may vary according to the characteristics of the image. In an example, based on the driver IC controlling the plurality of light-emitting devices for displaying an image of a first color, the power load of the power supply may be a %, and based on the driver IC controlling the plurality of light-emitting devices for displaying an image of a second color, the power load of the power supply may be b %.

The rated capacity of the power supply may be 100%. The gain value may be set to a maximum value within a limit in which the power load of the power supply does not exceed the rated capacity. In an example, the power load of the power supply for displaying a specific image may be one from among 0% to 10%, and in this case, if the maximum gain value which does not exceed the rated capacity of the power supply is 2040, a gain value of 2040 may be set to the power load range of between 0% and 10%. Based on the power load of the power supply for displaying a different specific image being 11%, and if the maximum gain value which does not exceed the rated capacity of the power supply is 2038, a gain value of 2038 may be set to the power load of 11%. Through a method similar thereto, a plurality of gain values may be set to the plurality of power loads of a range in which the power load of the power supply exceeds 11%.

As described above, by setting the gain value based on the rated capacity of the power supply and the power load for displaying the image, the power of the power supply may be used effectively, and a deterioration phenomenon or the like of the power supply, which may occur when the power supply exceeds the rated capacity, may be prevented.

Figure 4:
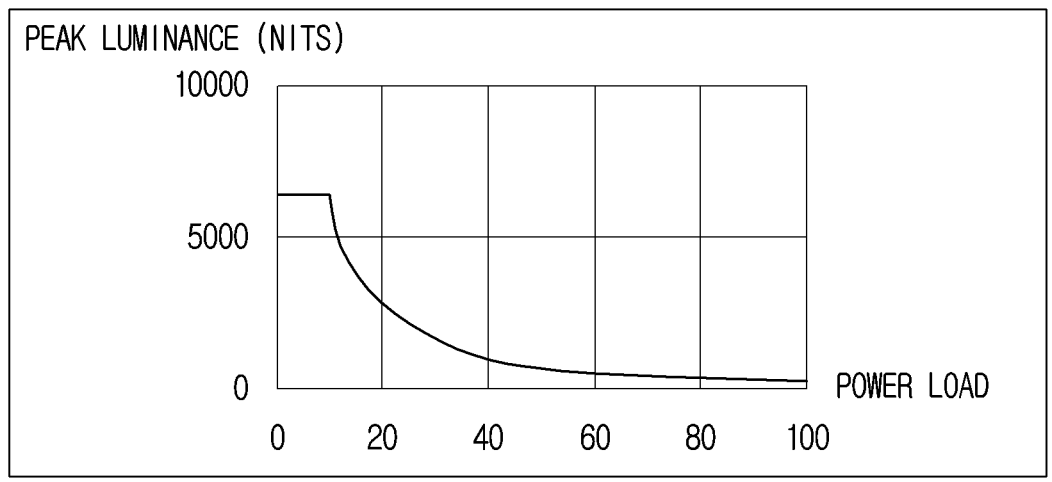
FIG. 4 is a diagram illustrating a luminance of an image which is displayed based on a first gain set according to an embodiment.

According to the image data corrected by the first gain set 10, an image having a luminance as in FIG. 4 may be displayed. Specifically, referring to FIG. 4, a gain value of 2040 may be applied to the image data according to the first gain set 10 in the range in which the power load is between 0% and 10%. Accordingly, the image which is displayed in the display may have a maximum luminance value. A value smaller than the gain value of 2040 may be applied to the image data according to the first gain set 10 in the range in which the power load exceeds 10%. Accordingly, the image which is displayed in the display may have a luminance value smaller than the maximum luminance value.

Accordingly, the modular display apparatus 100 may be configured to increase a contrast of an image by displaying an image having a high luminance value by providing a high gain value when the power load is less than or equal to 10%, and decrease power consumption of the power supply by displaying an image having a lower luminance value by providing other gain values when the power load exceeds 10%.

As described above, the storage 120 may be configured to store the plurality of gain sets which corresponds to the plurality of resolutions.

In an example, as illustrated in FIG. 5, the storage 120 may be configured to store the second gain set 20 which corresponds to the second resolution (e.g., resolution of 8 k).

Referring to FIG. 5, the plurality of gain values may be matched to the plurality of power loads included in the second gain set 20. In an example, a gain value of 2040 may be matched to the power load of between 0% and 40%, and a gain value smaller than 2040 may be matched to the power load of between 41% and 100%.

Figure 6:
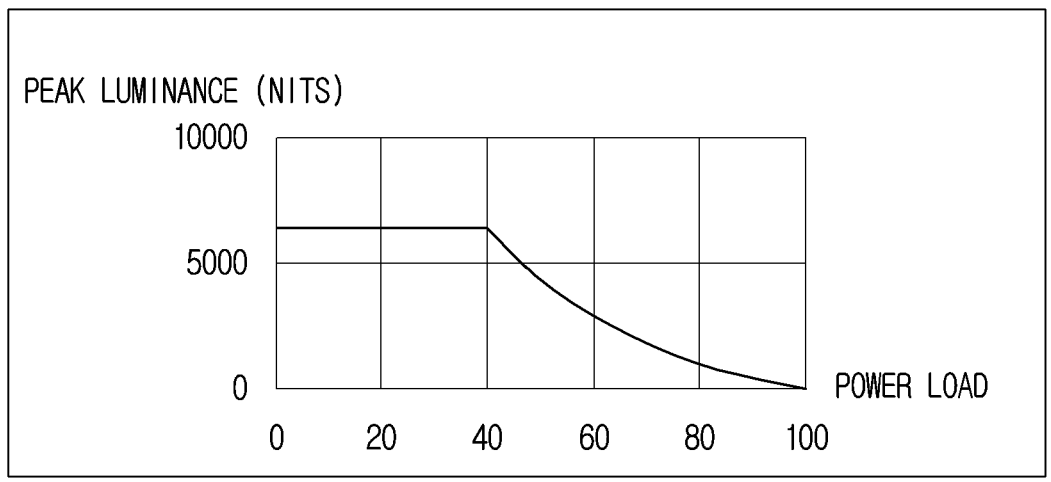
FIG. 6 is a diagram illustrating a luminance of an image which is displayed based on a second gain set according to an embodiment.

According to the image data corrected by the second gain set 20, an image having a luminance as in FIG. 6 may be displayed. Specifically, referring to FIG. 6, a gain value of 2040 may be applied to the image data according to the second gain set 20 in a range in which the power load is between 0% and 10% and the image which is displayed in the display may have a maximum luminance value, and a value smaller than the gain value of 2040 may be applied to the image data according to the second gain set 20 in the range in which the power load exceeds 40% and the image which is displayed in the display may have a luminance value smaller than the maximum luminance value.

The processor 130 may be configured to transmit the image data and the gain set corresponding to the resolution of the modular display apparatus 100 to the plurality of display apparatuses. In an example, the processor 130 may be configured to transmit, based on the resolution of the modular display apparatus 100 being a resolution of 4 k, the gain set corresponding to the resolution of 4 k to the plurality of display apparatuses, and based on the resolution of the modular display apparatus 100 being a resolution of 8 k, transmit the gain set corresponding to the resolution of 8 k to the plurality of display apparatuses.

In this case, the respective display apparatuses may be configured to identify image data corresponding to the identification information of the respective display apparatuses from among the image data received from the processor 130. Identification information different from one another may be set to the plurality of display apparatuses.

The respective display apparatuses may be configured to identify the power load for displaying the image data which corresponds to the identification information of the respective display apparatuses.

Specifically, the respective sub processors included in the plurality of display apparatuses may be configured to identify the power load for displaying the image data identified based on the power load data in which the plurality of power loads is matched that corresponds to a plurality of grayscale values. Here, the power load included in the power load data may have a normalized value in the range of between 0% and 100%. In an example, a power load of 100% may be matched to a first grayscale value for displaying a first color (e.g., white color), and a power load of 0% may be matched to a second grayscale value for displaying a second color (e.g., black color).

The respective sub processors included in the plurality of display apparatuses may be configured to identify the plurality of grayscale values which corresponds to the plurality of pixels of the respective sub processors based on the image data, and identify the plurality of power loads which corresponds to the plurality of grayscale values based on the power load data. Each of the respective sub processors may be configured to identify a corresponding power load which is a total of the plurality of power loads of the corresponding display apparatus as the power load for displaying the image data.

The respective display apparatuses may be configured to identify the gain value which corresponds to the power load for displaying the image data which corresponds to the identification information of the respective display apparatuses from among the plurality of gain values included in the gain set received from the processor 130, and transmit the identified gain value to the processor 130.

Specifically, the respective sub processors included in the plurality of display apparatuses may be configured to identify the gain value which corresponds to the power load which is a total of the plurality of power loads that corresponds to the plurality of grayscale values from among the plurality of gain values included in the gain set received from the processor 130, and transmit the identified gain value to the processor 130.

Accordingly, the processor 130 may be configured to receive a plurality of gain values which corresponds to the power load for displaying the image in the respective display apparatuses from among the plurality of gain values included in the gain set from each of the plurality of display apparatuses.

In this case, the processor 130 may be configured to identify a minimum gain value from among the plurality of gain values received from the plurality of display apparatuses, and transmit the minimum gain value to the plurality of display apparatuses.

The respective display apparatuses may be configured to display the image by driving the plurality of light-emitting devices based on the gain value received from the processor 130.

Specifically, the respective display apparatuses may be configured to apply the gain value received from the processor 130 to an electrical signal corresponding to a value of the image data, and drive the plurality of light-emitting devices based on the electrical signal to which the gain value is applied. The electrical signal, as analog data, may be data voltage or data current which is provided to the plurality of light-emitting devices. Accordingly, the plurality of light-emitting devices may be configured to provide an image having high luminance based on the data voltage or data current applied with the gain value.

For example, the modular display apparatus 100 may identify a gain value to be applied to each of the plurality of display apparatuses for each displayed frame of video data displayed by the modular display apparatus 100.

As described above, by displaying an image based on the gain set identified based on the resolution of the modular display apparatus 100, the luminance of the image, which is displayed when the modular display apparatus 100 has a first resolution, may be within a threshold value of the luminance of the image, which is displayed when the modular display apparatus 100. For example, the luminance of the image which is displayed in the modular display apparatus 100 having a first resolution and the luminance of the image which is displayed in the modular display apparatus 100 having a second resolution may be the same.

Figure 7A:
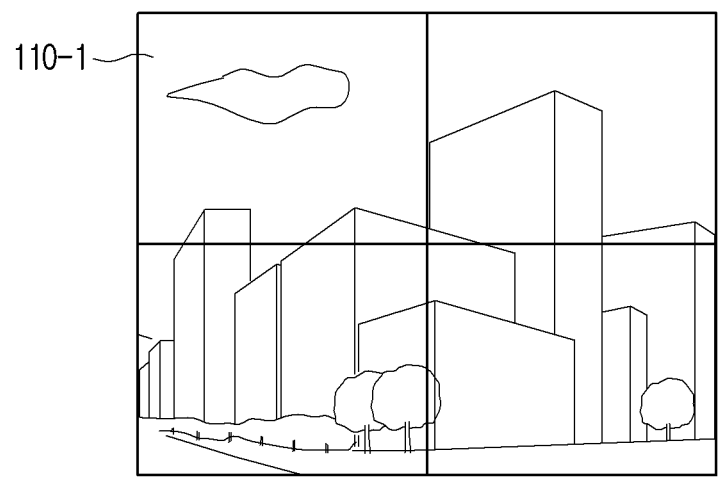
FIG. 7A is a diagram illustrating a first modular display apparatus having a first resolution according to an embodiment.
Figure 7B:
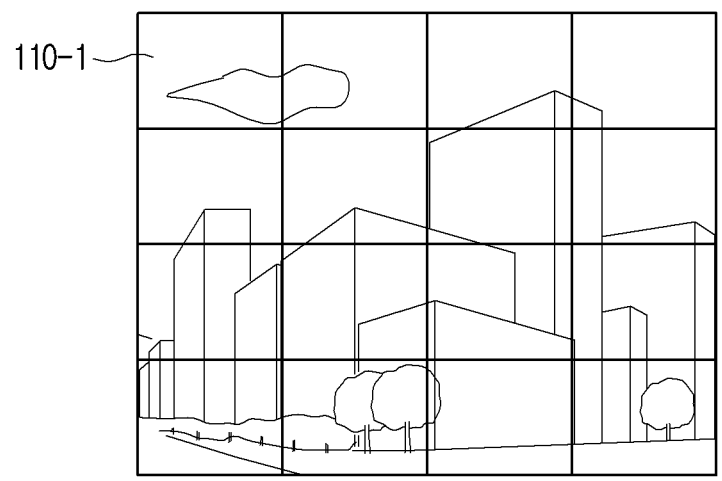
FIG. 7B is a diagram illustrating a second modular display apparatus having a second resolution according to an embodiment.

FIGS. 7A to 7B illustrates modular display apparatuses according to according to embodiments.

FIG. 7A is a diagram illustrating a first modular display apparatus 100-A having a first resolution (e.g., resolution of 4 k of 3840*2160) according to the plurality of display apparatuses being combined in a 4*4 arrangement and each having a resolution of 960*540, and FIG. 7B is a diagram illustrating a second modular display apparatus 100-B having a second resolution (e.g., resolution of 8 k of 7680*4320) according to the plurality of display apparatuses being combined in a 8*8 arrangement and each having a resolution of 960*540.

Referring to FIG. 7A, each of the plurality of display apparatuses which comprise the first modular display apparatus 100-A may be configured to identify the power load of the power supply based on corresponding image data, and transmit information on the gain value which corresponds to the power load to the processor 130.

The processor 130 may be configured to identify the minimum gain value from among the plurality of gain values and transmit the minimum gain value to the plurality of display apparatuses.

For example, the power load of the first display apparatus 110-1 may be 14% of a maximum load. Accordingly, the gain value identified, for example based on the first gain set 10, by the first display apparatus 110-1 may be 2012. The gain value of 2012 may be lower than gain values received from other display apparatuses of the first modular display apparatus 100-A. Thus, the processor 130 may identify 2012 as a minimum gain value and transmit information on the gain value of 2012 to the plurality of display apparatuses. In this case, the plurality of display apparatuses may be configured to apply the gain value of 2012 to the data voltage (or, data current) which is applied to the plurality of light-emitting devices, and control the plurality of light-emitting devices based on the image data to which the gain value of 2012 is applied. Accordingly, the first modular display apparatus 100-B may display an image based on the image data to which the gain value of 2012 is applied.

Referring to FIG. 7B, each of the plurality of display apparatuses which comprise the second modular display apparatus 100-B may be configured to identify the power load of the power supply based on the plurality of image data similar with the above-described method, and transmit the information on the gain value which corresponds to the power load to the processor 130.

Here, the gain value which corresponds to the power load may vary according to the resolution of the modular display apparatus 100. That is, the plurality of gain values identified by the plurality of display apparatuses that comprise the first modular display apparatus 100-A may be different from the plurality of gain values identified by the plurality of display apparatuses that comprise the second modular display apparatus 100-B. This is because the divided image displayed by the respective apparatuses may vary according to the resolution of the display being varied. For example, the plurality of gain values of the first modular display apparatus 100-A may be identified based on the first gain set 10, and the plurality of gain values of the second modular display apparatus 100-B may be identified based on the second gain set 20.

The processor 130 may be configured to receive a plurality of gain values from the plurality of display apparatuses of the modular display apparatus 100-B, identify the minimum gain value from among the plurality of gain values, and transmit the minimum gain value to the plurality of display apparatuses.

For example, the power load of the first display apparatus 110-1 may be 44% of a maximum load. The gain value identified by the first display apparatus 110-1, for example based on the second gain set 20, may be 2012. The gain value of 2012 may be lower than gain values received from other display apparatuses of the second modular display apparatus 100-B. Thus, the processor 130 may identify 2012 as a minimum gain value and transmit information on the gain value of 2012 to the plurality of display apparatuses. In this case, the plurality of display apparatuses may be configured to apply the gain value of 2012 to the data voltage (or, data current) which is applied to the plurality of light-emitting devices, and control the plurality of light-emitting devices based on the image data to which the gain value of 2012 is applied. Accordingly, the second modular display apparatus 100-B may display an image based on the image data to which the gain value of 2012 is applied.

Here, it may be confirmed that the image displayed by the first modular display apparatus 100-A and the image displayed by the second modular display apparatus 100-B are based on the image data to which the same gain value is applied. According to an embodiment, the image displayed by the first modular display apparatus 100-A and the image displayed by the second modular display apparatus 100-B may also be based on the image data to which a similar, but different, gain value is applied.

Accordingly, the luminance of the image which is displayed by the first modular display apparatus 100-A which has a first resolution may be within a threshold value of the luminance of the image which is displayed by the second modular display apparatus 100-B which has a second resolution different from the first resolution.

Accordingly, embodiments may solve the problem of a modular display apparatus which displays the same image in different luminance by correcting the image data based on one gain set even if the image which is displayed in the respective display apparatuses is changed according to a change in the number of display apparatuses.

In the above, a resolution of 4 k and a resolution of 8 k have been described as examples, but this is one embodiment, and the modular display apparatus 100 may be configured to a resolution different from the resolutions described above.

Figure 8:
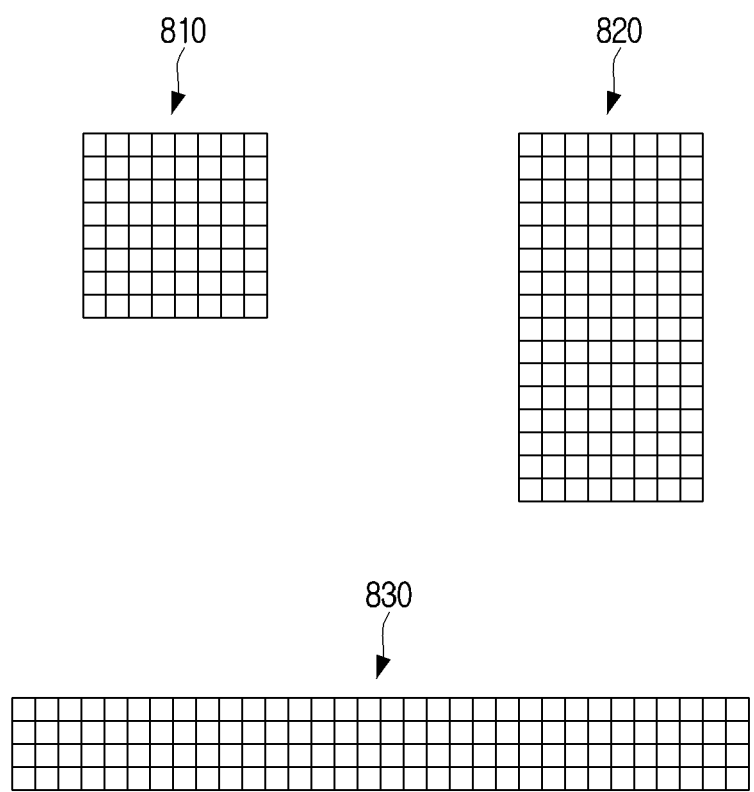
FIG. 8 is a diagram illustrating modular display apparatuses of rectangular arrangements according to embodiments.

In addition, as illustrated in FIG. 8, embodiments may be applied to a modular display apparatus 810 in which the plurality of display apparatuses are combined in a square arrangement, a modular display apparatus 820 in which the plurality of display apparatuses are combined in a vertical rectangular arrangement, and/or a modular display apparatus 830 in which the plurality of display apparatuses are combined in a horizontal rectangular arrangement.

Figure 9:
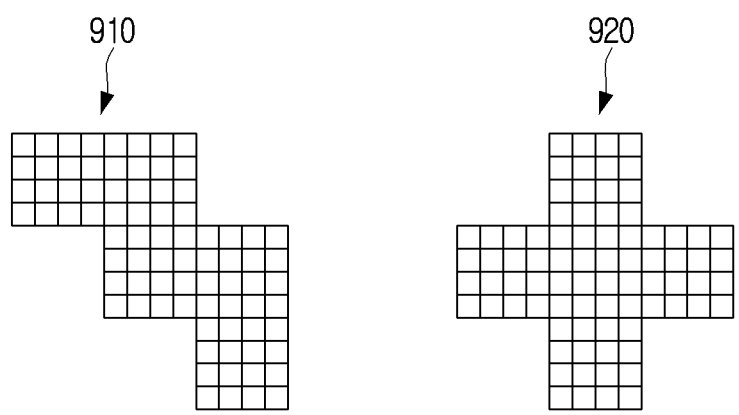
FIG. 9 is a diagram illustrating modular display apparatuses which are not rectangular according to embodiments.

According to embodiments, the plurality of display apparatuses may be combined in other polygonal arrangements. In this case, the image data may be corrected according to the minimum gain value identified based on a pre-set gain set from among the plurality of gain sets. In an example, as illustrated in FIG. 9, based on modular display apparatuses 910 and 920 not being in a rectangular arrangement according to the plurality of display apparatuses being combined, the image data may be corrected according to the minimum gain value identified based on the pre-set gain set from among the plurality of gain sets. Here, the pre-set gain set may, for example, be a gain set which corresponds to a resolution of 4 k, but is not necessarily limited thereto.

In the above, the plurality of gain sets being pre-stored in the storage 120 has been described as an example. However, embodiments are not limited thereto and, for example, one gain set may be stored in the storage, and the processor 130 may be configured to generate a new gain set based on the resolution of the modular display apparatus 100.

Specifically, the first gain set which corresponds to the first resolution may be stored in the storage 120 as in FIG. 3. Based on the resolution of the modular display apparatus 100 being realized to the second resolution which is higher than the first resolution, the processor 130 may be configured to generate the second gain set in which a peak gain value is set in a second power load (e.g., power load of between 0% and 40% as in FIG. 5). For example, the second power load corresponding to the peak gain value may have a wider range than a first power load (in FIG. 3, a power load of between 0% and 10%) which corresponds to a peak gain value (in FIG. 3, gain value of 2040) of the first gain set. Alternatively, the processor 130 may be configured to generate a third gain set in which a peak gain value is set in the second power load (e.g., power load of between 0% and 5%) of a narrower range than the first power load (in FIG. 3, power load of between 0% and 10%) which corresponds to the peak gain value (in FIG. 3, gain value of 2040) of the first gain set based on the resolution of the modular display apparatus 100 being realized to a third resolution which is lower than the first resolution.

Figure 10:
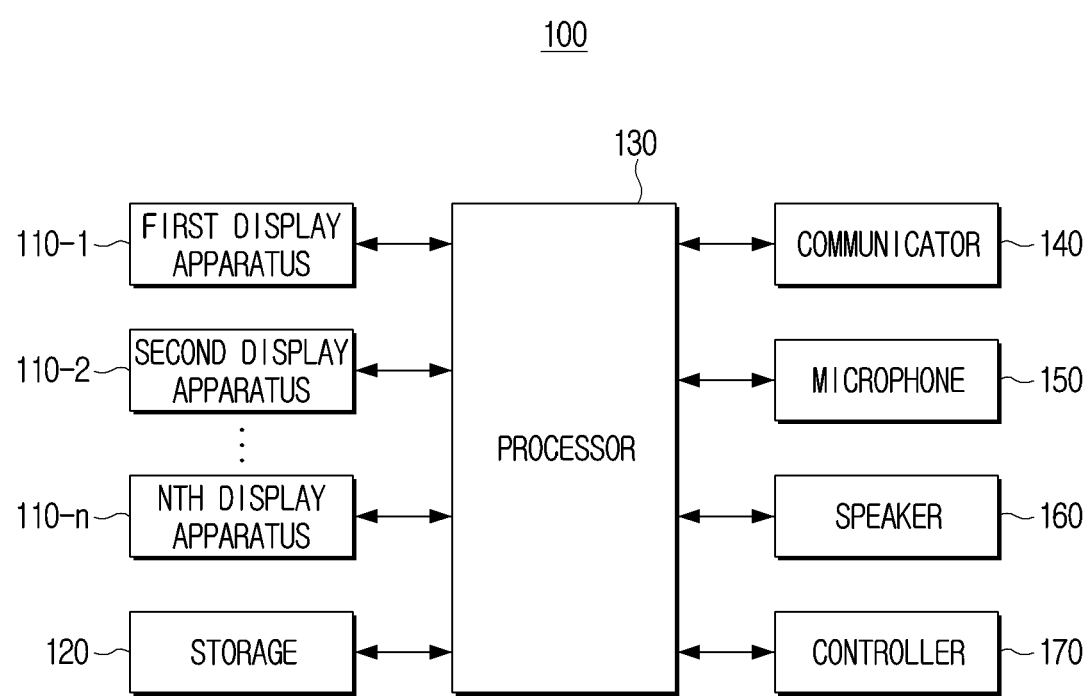
FIG. 10 is a block diagram illustrating a modular display apparatus according to an embodiment.

FIG. 10 is a block diagram illustrating the modular display apparatus according to an embodiment.

Referring to FIG. 10, the modular display apparatus 100 according to an embodiment may include a first display apparatus 110-1, a second display apparatus 110-2 . . . , an nth display apparatus 110-$n$, a storage 120, a communicator 140, a microphone 150, a speaker 160, a controller 170, and a processor 130. Parts which overlap with the above-described descriptions will be omitted or abridged below.

The communicator 140 may include a transceiver (i.e., transmitter and receiver) and may be configured to communicate with various electronic apparatuses according to communication methods of various types. In an example, the communicator 140 may be configured to communicate with an external apparatus and receive at least one gain set from the external apparatus. Here, the gain set may include information on the plurality of gain values which corresponds to the plurality of power loads.

The communicator 140 may include communication modules such as a short range wireless communication module or a wireless local area network (LAN) communication module. Here, the short range wireless communication module may be a communication module which performs data communication wirelessly with an electronic apparatus located at a short distance, and may be, for example, and without limitation, a Bluetooth module, a ZigBee module, a near field communication (NFC) module, or the like. The wireless LAN communication module may be a module which performs communication by being connected to an external network according to a wireless communication protocol such as, for example, and without limitation, WiFi, IEEE, or the like.

In addition, the communicator 140 may also include a mobile communication module which performs communication by connecting to a mobile communication network according to various mobile communication standards such as, for example, and without limitation, 3rd Generation (3G), 3rd Generation Partnership Project (3GPP), Long Term Evolution (LTE), 5th Generation (5G), or the like. In addition, the communicator 140 may include at least one from among wired communication modules such as, for example, and without limitation, a Universal Serial Bus (USB), an Institute of Electrical and Electronics Engineers (IEEE) 1394, a RS-232, or the like, and include a broadcast receiving module which receives TV broadcasts.

The microphone 150 may be configured to receive a user voice that may indicate a user voice command. Here, the user voice command may indicate a command for executing a specific function of the modular display apparatus 100. In an example, the user voice command may indicate a command for correcting the luminance of the image.

Based on receiving the user voice through the microphone 150, the processor 130 may be configured to analyze the user voice through a Speech to Text (STT) algorithm, and provide response information which corresponds to the user voice. Here, the response information may be a response to a user voice command, and may be information received through an external server as well as information generated by the modular display apparatus 100 itself.

The speaker 160 may be configured to output various audio signals to which various processing operations such as decoding, amplification, and noise filtering are performed by the audio processor. In addition, the speaker 160 may be configured to output various notification sounds or voice messages.

The controller 170 may be implemented as any one or any combination of a touch screen, a touchpad, a display, a key button, a key pad, or the like.

The modular display apparatus 100 may further include a USB port to which a USB connector may be connected, various external input ports for connecting with various external terminals such as, for example, and without limitation, a headset, a mouse, LAN, or the like, a digital multimedia broadcasting (DMB) chip which receives and processes a DMB signal, or the like.

In addition, the modular display apparatus 100 may further include a broadcast receiver which receives a broadcast signal by a wired or wireless method from a broadcast company or a satellite, a signal separator which separates the broadcast signal received from the broadcast receiver to an image signal, an audio signal, and additional information signal, an A/V processor which performs video decoding and video scaling to the image signal and performs audio decoding to the audio signal, or the like.

Figure 11:
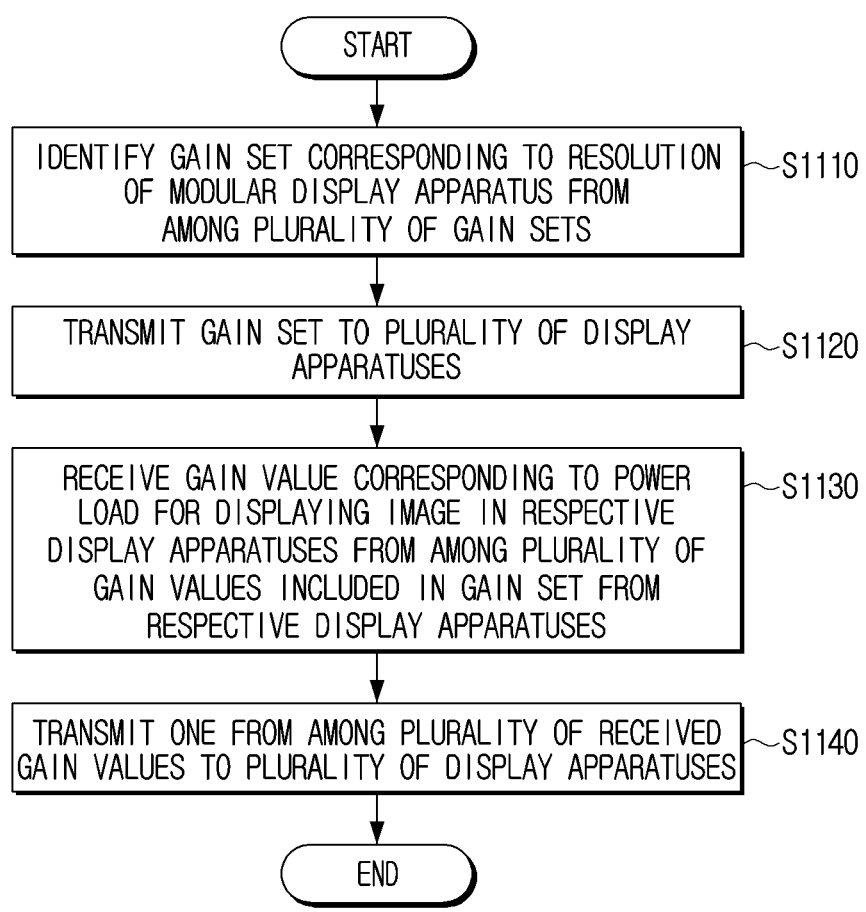
FIG. 11 is a flowchart illustrating a control method of a modular display apparatus according to an embodiment.

FIG. 11 is a diagram illustrating a control method of the modular display apparatus according to an embodiment.

The modular display apparatus 100 may identify the gain set which corresponds to the resolution of the modular display apparatus 100 from among the plurality of gain sets (S1110), and transmit the identified gain set to the plurality of display apparatuses (S1120).

Here, the respective display apparatuses may include pixels which include light-emitting devices of different colors. The resolution of the modular display apparatus 100 may be identified based on the number of pixels included in the respective display apparatuses.

Each gain set may include the plurality of gain values which corresponds to the plurality of power loads, and the modular display apparatus 100 may be configured to store the plurality of gain sets which corresponds to the plurality of resolutions.

The modular display apparatus 100 may be configured to receive the gain value which corresponds to the power load for displaying the image in the respective display apparatuses from among the plurality of gain values included in the gain set from the respective display apparatuses (S1130). Each of the display apparatuses which form the modular display apparatus 100 may be configured to identify a portion of image data which corresponds to the respective display apparatus from among the image data based on identification information. Each of the display apparatuses may identify the power load for displaying the image which corresponds to the identified portion of image data, and identify the gain value which corresponds to the corresponding power load from among the plurality of gain values included in the gain set.

The modular display apparatus 100 may identify one from among the plurality of received gain values, and transmit the one gain value to the plurality of display apparatuses (S1140).

Specifically, the modular display apparatus 100 may be configured to identify the minimum gain value from among the plurality of received gain values, and transmit the minimum gain value to the plurality of display apparatuses. In this case, the display apparatuses which comprise the modular display apparatus 100 may be configured to apply the gain value to an electrical signal corresponding to a value of the image data, and drive the plurality of light-emitting devices based on the electrical signal to which the gain value is applied.

The methods according to one or more embodiments described above may be implemented in a software or application form installable in a modular display apparatus.

In addition, the methods according to one or more embodiments described above may be implemented with a software upgrade or a hardware upgrade on a modular display apparatus.

In addition, one or more embodiments described above may be performed through an embedded server provided in the modular display apparatus 100, or through an external server of the modular display apparatus 100.

A non-transitory computer readable medium which is stored with a program sequentially executing the control method of the modular display apparatus according to the disclosure may be provided.

The non-transitory computer readable medium may refer to a medium that stores data semi-permanently rather than storing data for a very short time, such as a register, a cache, a memory, or the like, and is readable by a device. Specifically, the above-described application or programs may be stored and provided in the non-transitory computer readable mediums such as, for example, and without limitation, a compact disc (CD), a digital versatile disc (DVD), a hard disc, a Blu-ray disc, a USB, a memory card, a ROM, and the like.

While embodiments have been particularly shown and described, it will be understood that various changes in form and details may be made therein without departing from the spirit and scope of the following claims.

The invention claimed is:

1. A modular display apparatus, comprising:
a plurality of display apparatuses, each of which comprises a plurality of pixels;
a storage configured to store a plurality of gain sets, each of which comprises gain values respectively corresponding to a plurality of power loads; and
a processor configured to:
identify a gain set from among the plurality of gain sets based on a resolution of the modular display apparatus;
transmit the gain set to the plurality of display apparatuses;
receive a plurality of gain values which respectively correspond to power loads for the plurality of display apparatuses to display an image from the plurality of display apparatuses; and
transmit a gain value from among the plurality of gain values to the plurality of display apparatuses,
wherein each of the plurality of display apparatuses is configured to display the image by driving a plurality of light-emitting devices of the plurality of pixels based on the gain value received from the processor.

2. The modular display apparatus of claim 1, wherein the processor is further configured to identify a minimum gain value from among the plurality of gain values received from the plurality of display apparatuses, and identify the minimum gain value as the gain value to be transmitted to the plurality of display apparatuses.

3. The modular display apparatus of claim 1, wherein each of the plurality of display apparatuses is further configured to:
receive image data from the processor;
identify corresponding image data which from among the image data based on identification information of the plurality of display apparatuses;
identify a corresponding gain value which corresponds to a power load for displaying the corresponding image data from among the plurality of gain values; and
transmit the corresponding gain value to the processor.

4. The modular display apparatus of claim 3, wherein each of the plurality of display apparatuses is further configured to:
identify the power load for displaying the image based on the image data; and
identify the gain value based on the power load.

5. The modular display apparatus of claim 1, wherein the each of the plurality of display apparatuses is further configured to:
receive image data from the processor;
identify corresponding image data from among the image data;
apply the gain value received from the processor to an electrical signal corresponding to the corresponding image data; and
drive the plurality of light-emitting devices based on the electrical signal to which the gain value is applied.

6. The modular display apparatus of claim 1, wherein the processor is further configured to identify the resolution of the modular display apparatus based on a number of the plurality of display apparatuses.

7. The modular display apparatus of claim 1, wherein the processor is further configured to receive image data from an external apparatus, and identify the resolution of the plurality of display apparatuses based on resolution information of the image data.

8. The modular display apparatus of claim 1, wherein a first luminance of the image which is displayed by the plurality of display apparatuses based on the resolution being a first resolution is within a threshold value of a second luminance of the image which is displayed by the plurality of display apparatuses based on the resolution being a second resolution which is different from the first resolution.

9. A method of controlling a modular display apparatus which includes a plurality of display apparatuses, the method comprising:
identifying a gain set from among a plurality of gain sets based on a resolution of the modular display apparatus;
transmitting the gain set and image data to the plurality of display apparatuses;
receiving a plurality of gain values which respectively correspond to power loads for the plurality of display apparatuses to display an image from the plurality of display apparatuses;
transmitting a gain value from among the plurality of gain values to the plurality of display apparatuses; and
controlling each of the plurality of display apparatuses to drive a plurality of light-emitting devices based on the gain value and the image data.

10. The method of claim 9, further comprising: identifying a minimum gain value from among the plurality of gain values received from the plurality of display apparatuses; and
identifying the minimum gain value as the gain value to be transmitted to the plurality of display apparatuses.

11. The method of claim 9, further comprising:
identifying, for each of the plurality of display apparatuses, corresponding image data from among the image data; and
identifying, for each of the plurality of display apparatuses, a corresponding gain value which corresponds to a power load for displaying the corresponding image data from among the plurality of gain values.

12. The method of claim 11, further comprising identifying a plurality of power loads respectively corresponding to the plurality of display apparatuses for displaying the image based on the corresponding image data.

13. The method of claim 9, further comprising:
identifying corresponding image data for each of the plurality of display apparatuses from among the image data;
applying the gain value to an electrical signal corresponding to the corresponding image data; and
driving the plurality of light-emitting devices based on the electrical signal to which the gain value is applied.

14. The method of claim 9, wherein further comprising identifying the resolution of the modular display apparatus based on a number of the plurality of display apparatuses.

15. The method of claim 9, further comprising:
receiving image data from an external device; and
identifying the resolution of the plurality of display apparatuses based on resolution information of the image data.

\* \* \* \* \*